United States Patent
Savov

(10) Patent No.: US 7,362,469 B2
(45) Date of Patent: Apr. 22, 2008

(54) SYSTEM AND METHOD FOR CALCULATING TONER USAGE

(75) Inventor: Andrey I. Savov, Laguna Hills, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 709 days.

(21) Appl. No.: 10/806,652

(22) Filed: Mar. 23, 2004

(65) Prior Publication Data

US 2005/0213141 A1 Sep. 29, 2005

(51) Int. Cl.
*H04N 1/40* (2006.01)

(52) U.S. Cl. .................. 358/1.9; 358/2.1; 358/504

(58) Field of Classification Search .............. 358/1.9, 358/2.1, 1.15–1.16, 522, 529, 500, 502, 504; 347/19
See application file for complete search history.

(56) References Cited

U.S. PATENT DOCUMENTS

| | | | |
|---|---|---|---|
| 5,349,377 A * | 9/1994 | Gilliland et al. ............ 347/131 |
| 5,592,298 A | 1/1997 | Caruso | |
| 5,859,711 A | 1/1999 | Barry et al. | |
| 6,006,165 A | 12/1999 | Okada | |
| 6,035,103 A | 3/2000 | Zuber | |
| 6,219,155 B1 | 4/2001 | Zuber | |
| 6,271,937 B1 | 8/2001 | Zuber | |
| 6,356,359 B1 | 3/2002 | Motamed | |
| 6,580,879 B2 | 6/2003 | Coleman et al. | |
| 6,636,326 B1 | 10/2003 | Zuber | |
| 6,663,396 B1 | 12/2003 | Wang | |
| 2002/0012766 A1 * | 1/2002 | Faris et al. ................. 428/100 |
| 2002/0089684 A1 | 7/2002 | Barry et al. | |
| 2003/0044188 A1 | 3/2003 | Coleman et al. | |
| 2003/0202204 A1 | 10/2003 | Terrill et al. | |

* cited by examiner

*Primary Examiner*—Thomas D. Lee
*Assistant Examiner*—Stephen Brinich
(74) *Attorney, Agent, or Firm*—Tucker Ellis & West LLP

(57) ABSTRACT

A system and method for calculating the toner usage of a multifunction peripheral device using software and the compressed form of the raster image without uncompressing the image. The method enables the calculation of toner usage based on the statistics of actual colorant consumption while minimizing the approximation error. The compressed image data includes encoded data representing an image mapped onto a first color space. The received compressed image is analyzed to generate a pixel count of each color associated with the image corresponding to a color in the first color space. In the event of a different device color space, the pixel count is translated to a second color space, and an aggregate pixel count is calculated. When statistical data from actual operations is available, table data on the earlier usage is compared with the pixel count calculated, resulting in an approximate toner usage having low approximation error. When no previous statistical data is available, the method uses the manufacturer stored toner usage and compares the pixel count thereon. A device table is then generated, storing an adjusted table containing actual usage statistics for further calculations regarding subsequent usages.

28 Claims, 3 Drawing Sheets

SYSTEM AND METHOD FOR CALCULATING TONER USAGE

BACKGROUND OF THE INVENTION

This invention is directed to a system and method for calculating toner usage. More particularly, this invention is directed to a system and method for calculating percent of toner coverage or usage from compressed image data.

Consumables accounting in office and production environments is a high-demand feature for all types of document processing devices, particularly multifunctional peripheral devices. Most users expect a job accounting feature which has the ability to determine the pages printed as well as complete usage data for a user, a group of users, or a department. Estimating the percentage of toner or ink coverage is a difficult task to handle with software due to the large amounts of data involved. For example, a single page letter at 600 dpi contains 4 megabytes of data in its uncompressed form. At 5% coverage, which is a conservative estimate, would require 210,375 black pixels on the page. A single page at 1200 dpi would result in a four-fold increase to 16 megabytes and 841,500 black pixels on the page.

The time and storage space required to locate and count that many pixels on a modest size page makes it impractical to solve with software. Most solutions have included additional hardware to determine the percent coverage or have altered the toner cartridges to report the toner usage.

There is a need for a system and method for calculating toner usage using software and based on the compressed form of the raster image without uncompressing them to achieve higher processing speed and less resource consumption.

SUMMARY OF THE INVENTION

In accordance with the present invention, there is provided a system and method for calculating toner usage using software and based on the compressed form of the raster image without uncompressing them to achieve higher processing speed and less resource consumption.

Further, in accordance with the present invention, there is provided a system and method for calculating toner usage which minimizes the approximation error and is based on statistics of actual consumption.

Still further in accordance with the present invention, there is provided a system and method for calculating toner usage with sufficiently low bounded error from the number of pixels of each color in the device color space.

Still further, in accordance with the present invention, there is provided a system for calculating toner usage. The system comprises means adapted for receiving compressed image data, which compressed image data includes encoded data representative of an associated image mapped to a first color space. The system also comprises means adapted for analyzing received compressed image data so a to generate a representative pixel count of pixels associated with each color of the first color space.

Still further, in accordance with the present invention, there is provided a method for calculating toner usage. The method comprises the step of receiving compressed image data, which compressed image data includes encoded data representative of an associated image mapped to a first color space. The method also includes the step of analyzing received compressed image data so a to generate a representative pixel count of pixels associated with each color of the first color space.

In a preferred embodiment of the system and method according to the present invention, the compression algorithms include JPEG and LZW.

These and other aspects, features, and advantages of the present invention will be understood by one skilled in the art upon reading and understanding the specification.

DETAILED DESCRIPTION OF THE PREFERRED EMBODIMENTS

Figure 1:
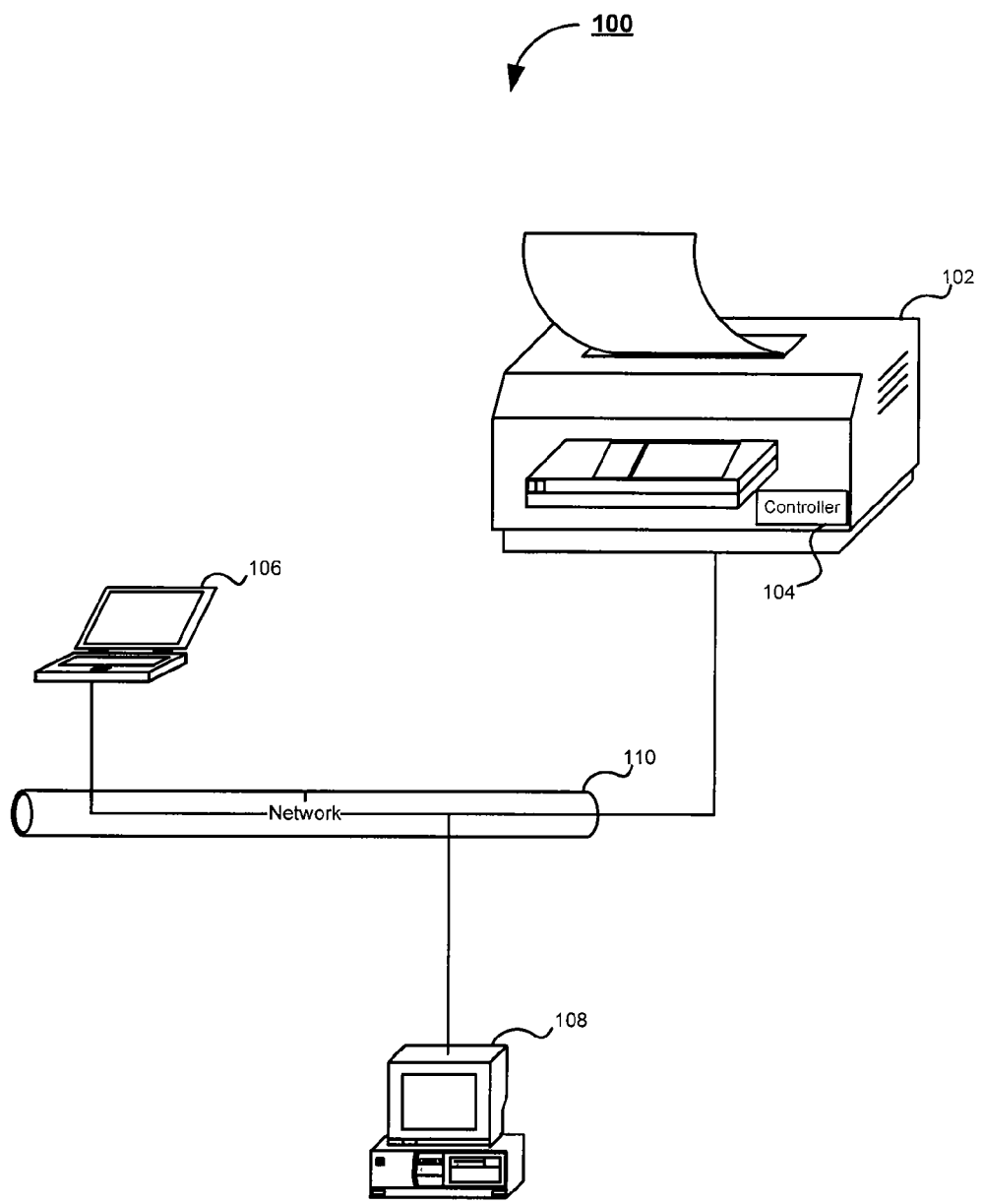
FIG. 1 illustrates an exemplary system for calculating toner usage according to the present invention.

Turning now to the drawings wherein the illustrations are for illustrating the preferred embodiment only, and not for delivering the same. Referring to FIG. 1, there is shown an exemplary system 100 for calculating toner usage according to the present invention. The system 100 comprises a multifunction peripheral device 102 suitably including a controller 104. It will be appreciated that the term multifunction peripheral generally refers to a device capable of performing multiple tasks, such as copying, facsimile, scanning and printing. The multifunction peripheral device 102 of system 100 includes a controller 104, typically comprising a processor component, associated memory and a communications component. The controller 104 functions to control the multifunction peripheral device 102, directing the multifunction peripheral device 102 operations and enabling communications between the multifunction peripheral device 102 and other devices.

For example, as shown in FIG. 1, the system 100 resides on a computer network 110, allowing multiple computers 106, 108 to communicate and use the capabilities of the multifunction peripheral device 102. The network 110 may be any suitable network known in the art, for example and without limitation, Ethernet, Token Ring, or the Internet. The computers 106 and 108 transmit data to the multifunction peripheral device 102 through the controller 104 over the computer network 110. It will be appreciated by those skilled in the art that the multifunction peripheral device 102 need not be coupled to the computer network 110, but rather may be in a stand-alone mode, i.e. connected to a single computer. The skilled artisan will understand that such a stand-alone configuration will not affect the operation of the present invention with respect thereto. The multifunction peripheral device 102 also comprises ink (toner) cartridges, printing heads, and the like (not shown). Those skilled in the art will appreciate that the multifunction peripheral device 102 may be any multifunction peripheral device known in the art, including but not limited, for example, the Toshiba e-Studio Series Controller.

Figure 2:
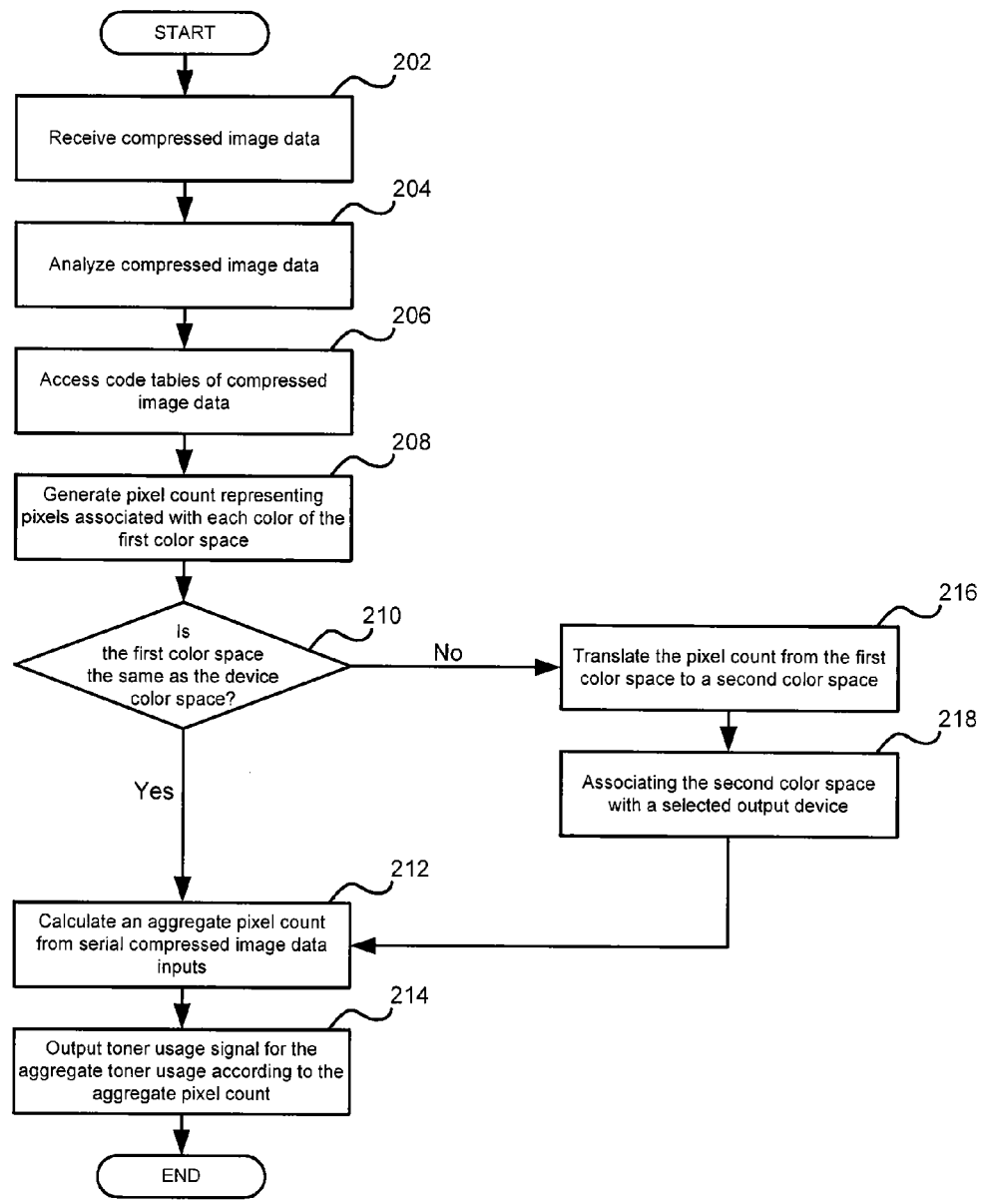
FIG. 2 is a flow chart of the method according to the present invention.

Turning now to FIG. 2, there is shown flow chart of the method of the present invention. Beginning at step 202, the controller 104 of the multifunction peripheral device 102 receives compressed image data. The encoded data typically represents an image, mapped to a first color space. It will be appreciated by those skilled in the art that the type of compression used to generate the raster images may, for example, be LZW or JPEG. However, the compression of the images need not be limited solely to these, but rather the skilled artisan will appreciate that the subject invention may suitably be used with other compression methods. The data may be, but need not be limited to a document, a photo-quality print, or other file that is to be output by the printing portion of the multifunction peripheral device 102. As will be understood in the art, a color space is generally a particular model of colors, represented by a tri-dimensional map. For example, the cathode ray tube, or television, uses a color space comprised of three primary colors, red, green and blue, this is commonly referred to as the RGB color space.

After receiving the compressed image data at step 202, the image data is then analyzed without decompressing at step 204. The table codes of the compressed data are subsequently accessed at step 206 so as to generate a pixel count representing the pixels associated with each color of the first color space at step 208. The subject invention provides that toner coverage is computed with low-bounded error from the number of pixels of each color in the final device color space.

Therefore, the system must determine, at step 210, if the first color space is the same as the device color space. When the determination at step 210 indicates that the color spaces are the same, the method proceeds to step 212, wherein an aggregate pixel count from serial compressed image data inputs is calculated. At step 214, a toner usage signal for the aggregate toner usage according to the aggregate pixel count is output.

Returning to step 210, when it is determined that the first color space and the second color space are not based on the same color model, the method proceeds to step 216, wherein the pixel count from the first color space is translated to a pixel count of a second color space. Therefore, an output from a monitor in the RGB color space may be translated, or mapped, into the multifunction peripheral 102 color space of cyan, magenta, yellow and black, commonly referred to as CMYK at step 216. The second color space is thereby associated with the selected output device, i.e., the multifunction peripheral device 102 at step 218. It will be appreciated by those skilled in the art that step 218 is not typically necessary, as the second color space is generally the device color space. However, in an alternate embodiment, step 218 is used when the raster images are not produced in the same color space as the device color space. The skilled artisan will appreciate that such an event is a rarity, however the occurrence thereof will not impact the functioning of the subject invention. The method then progresses to step 212, where an aggregate pixel count from serial compressed data inputs are calculated using the second color space. At step 214, a toner usage signal for the aggregate toner usage according to the aggregate pixel count of the second color space is output. It will be appreciated by those skilled in the art that the color space may be, but need not be limited to, black and white, monochromatic colors, additive primary colors, spot colors, subtractive, non-primary colors, or subtractive primary colors.

Figure 3:
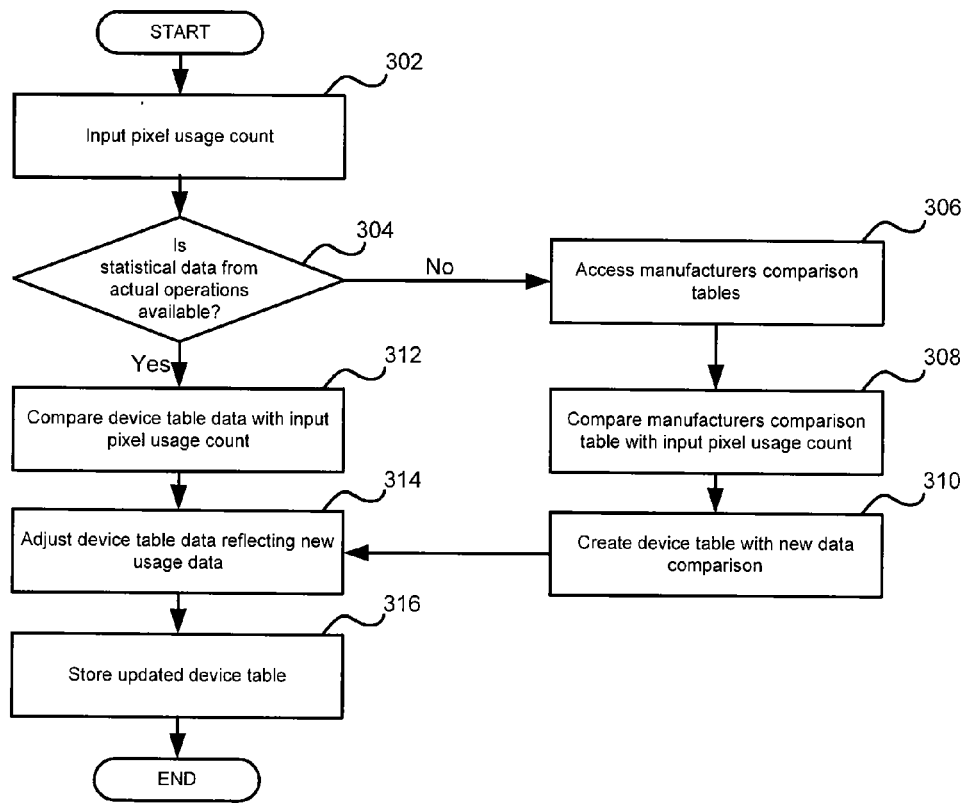
FIG. 3 is a flow chart of the determination of the toner usage by the method according to the present invention.

As shown in FIG. 3, in order to derive the actual toner amounts used during operation given pixel counts and maintain accurate results, the method compares statistical data. Beginning at step 302, the method receives an input of the pixel usage count, as determined above. The system then determines whether there exists statistical data from actual operations at step 304. Upon the determination that there is stored in a device table previous data regarding toner usage, the method proceeds to step 312, wherein the device table containing the earlier data is compared with the input pixel usage count. The device table is adjusted at step 314, to reflect the new calculations regarding toner usage and the adjusted device table is stored at step 316.

Returning to step 304, when no statistical information is available, the system accesses the initial manufacturer installed tables at step 306. Typically, these installed tables are based upon measuring conducted during actual test runs of production line machines. It will be appreciated by those skilled in the art that such testing is commonplace in the industry. The manufacturers table data is compared with the input pixel usage count, previously derived as explained in FIG. 2, at step 308. Once this comparison is completed, the system updates the table with the actual toner consumption based on physical toner consumption measurements at step 310.

Following the comparison of step 310, the system progresses to step 314, wherein the new tables are adjusted based on actual consumption now that the multifunction peripheral device 102 is in actual operation. It will be appreciated by those skilled in the art that the adjustment, as contemplated at step 314, suitably comprises dividing the total amount of toner consumption per colorant by the total number of pixels output of that corresponding color. The adjusted, or updated, device table is then stored by the multifunction peripheral device 102 at step 316.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, the foregoing description may suitably be adapted to computer-readable medium of instructions for performing the above-described method on the controller 104 of the multifunction peripheral device 102. The embodiment was chosen and described to provide the best illustration of the principles of the invention and its practical application to thereby enable one of the ordinary skilled in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

What is claimed is:

1. A system for calculating toner usage comprising:
   means adapted for receiving compressed image data, which compressed image data includes encoded data representative of an associated image mapped to a first color space;
   means adapted for analyzing received compressed image data so a to generate a representative pixel count of pixels associated with each color of the first color space; and
   translation means adapted for translating the representative pixel count of pixels associated with each color of the first color space into a representative count of pixels associated with a rendering of the associated image as mapped into a second color space.

2. The system for calculating toner usage of claim 1 wherein the second color space is associated with a selected output device.

3. The system for calculating toner usage of claim 2 further comprising aggregating means adapted for calculating an aggregate pixel count from a plurality of serial compressed image data inputs.

4. The system for calculating toner usage of claim 3 further comprising means adapted for outputting a toner usage signal representative of aggregate toner usage in accordance with the aggregate pixel count.

5. The system for calculating toner usage of claim 1 wherein the first color space is black and white.

6. The system for calculating toner usage of claim 1 wherein the first color space is comprised of additive primary colors.

7. The system for calculating toner usage of claim 1 wherein the first color space is comprised of subtractive primary colors.

8. The system for calculating toner usage of claim 1 wherein the second color space is comprised of subtractive, non-primary colors.

9. The system for calculating toner usage of claim 1 wherein the second color space is comprised of subtractive primary colors.

10. The system for calculating toner usage of claim 1 wherein the second color space is black and white.

11. A method for calculating toner usage comprising the steps of:
   receiving compressed image data, which compressed image data includes encoded data representative of an associated image mapped to a first color space;
   analyzing received compressed image data so a to generate a representative pixel count of pixels associated with each color of the first color space; and
   translating the representative pixel count of pixels associated with each color of the first color space into a representative count of pixels associated with a rendering of the associated image as mapped into a second color space.

12. The method for calculating toner usage of claim 11 wherein the second color space is associated with a selected output device.

13. The method for calculating toner usage of claim 12 further comprising the step of calculating an aggregate pixel count from a plurality of serial compressed image data inputs.

14. The method for calculating toner usage of claim 13 further comprising the step of outputting a toner usage signal representative of aggregate toner usage in accordance with the aggregate pixel count.

15. The method for calculating toner usage of claim 11 wherein the first color space is black and white.

16. The method for calculating toner usage of claim 11 wherein the first color space is comprised of additive primary colors.

17. The method for calculating toner usage of claim 11 wherein the first color space is comprised of subtractive primary colors.

18. The method for calculating toner usage of claim 11 wherein the second color space is comprised of subtractive, non-primary colors.

19. The method for calculating toner usage of claim 11 wherein the second color space is comprised of subtractive primary colors.

20. The method for calculating toner usage of claim 11 wherein the second color space is black and white.

21. A computer-readable medium for calculating toner usage comprising:
   means adapted for receiving compressed image data, which compressed image data includes encoded data representative of an associated image mapped to a first color space;
   means adapted for analyzing received compressed image data so a to generate a representative pixel count of pixels associated with each color of the first color space; and
   translation means adapted for translating the representative pixel count of pixels associated with each color of the first color space into a representative count of pixels associated with a rendering of the associated image as mapped into a second color space.

22. The computer-readable medium for calculating toner usage of claim 21 wherein the second color space is associated with a selected output device.

23. The computer-readable medium for calculating toner usage of claim 21 further comprising aggregating means adapted for calculating an aggregate pixel count from a plurality of serial compressed image data inputs.

24. The computer-readable medium for calculating toner usage of claim 21 further comprising means adapted for outputting a toner usage signal representative of aggregate toner usage in accordance with the aggregate pixel count.

25. A computer-implemented method for calculating toner usage comprising the steps of:
   receiving compressed image data, which compressed image data includes encoded data representative of an associated image mapped to a first color space;
   analyzing received compressed image data so a to generate a representative pixel count of pixels associated with each color of the first color space; and
   translating the representative pixel count of pixels associated with each color of the first color space into a representative count of pixels associated with a rendering of the associated image as mapped into a second color space.

26. The computer-implemented method for calculating toner usage of claim 25 wherein the second color space is associated with a selected output device.

27. The computer-implemented method for calculating toner usage of claim 26 further comprising the step of calculating an aggregate pixel count from a plurality of serial compressed image data inputs.

28. The computer-implemented method for calculating toner usage of claim 27 further comprising the step of outputting a toner usage signal representative of aggregate toner usage in accordance with the aggregate pixel count.

* * * * *